(12) United States Patent
Kuwabara et al.

(10) Patent No.: US 9,408,398 B2
(45) Date of Patent: Aug. 9, 2016

(54) APPARATUS FOR ALIGNING AND POSITIONING PIECES OF FOOD DOUGH

(71) Applicant: RHEON AUTOMATIC MACHINERY CO., LTD., Utsunomiya-shi, Tochigi-ken (JP)

(72) Inventors: Hitoshi Kuwabara, Utsunomiya (JP); Nobuo Oshima, Utsunomiya (JP)

(73) Assignee: RHEON AUTOMATIC MACHINERY CO., LTD., Utsunomiya-shi (JP)

( * ) Notice: Subject to any disclaimer, the term of this patent is extended or adjusted under 35 U.S.C. 154(b) by 0 days.

(21) Appl. No.: 14/615,707

(22) Filed: Feb. 6, 2015

(65) Prior Publication Data

US 2015/0223474 A1    Aug. 13, 2015

(30) Foreign Application Priority Data

Feb. 7, 2014    (JP) .................. 2014-022332

(51) Int. Cl.
*A21C 9/08* (2006.01)
*B65G 47/244* (2006.01)
*B65G 47/26* (2006.01)
*A21C 11/10* (2006.01)
*B65G 37/00* (2006.01)

(52) U.S. Cl.
CPC .............. *A21C 9/085* (2013.01); *A21C 11/10* (2013.01); *B65G 37/00* (2013.01); *B65G 47/244* (2013.01); *B65G 47/26* (2013.01); *B65G 2203/0225* (2013.01); *B65G 2811/0626* (2013.01)

(58) Field of Classification Search
CPC ...... B65G 37/00; B65G 47/224; B65G 47/26; B65G 47/28; B65G 47/32; B65G 47/82; B65G 47/902; B65G 47/907; B65G 2203/0225; B65G 2203/0233; B65G 2203/044; B65G 2811/0621; B65G 2811/0626; B65G 2811/0631; A21C 9/085; A21C 11/10

See application file for complete search history.

(56) References Cited

U.S. PATENT DOCUMENTS

| | | | | |
|---|---|---|---|---|
| 4,375,348 A | * | 3/1983 | Costa | A21C 11/10 425/297 |
| 5,142,956 A | * | 9/1992 | Ueno | A21C 3/06 198/379 |
| 5,338,170 A | * | 8/1994 | Hashimoto | A21C 9/063 118/16 |

(Continued)

FOREIGN PATENT DOCUMENTS

| | | | | |
|---|---|---|---|---|
| EP | 0670114 A1 | * | 9/1995 | A21C 3/06 |
| JP | 2007215478 A | * | 8/2007 | |

*Primary Examiner* — Leslie A Nicholson, III
*Assistant Examiner* — Keith R Campbell
(74) *Attorney, Agent, or Firm* — Sughrue Mion, PLLC (57) ABSTRACT

An apparatus for aligning and positioning a plurality of pieces of food dough having a triangular shape on a conveyor. The apparatus includes an upstream conveyor conveying the pieces of food dough having a triangular shape, a downstream conveyor faster than the upstream conveyor, a separating apparatus separating a plurality of the pieces of food dough set in a line in the perpendicular direction to the moving direction of the conveyor from the following row of the pieces and translocating them from the upstream conveyor to the downstream conveyor, a laying-out and rotating apparatus laying-out and rotating a plurality of the pieces set in a line so that they are positioned at predetermined intervals in the perpendicular direction to the moving direction of the conveyor and are rotated 90 degrees in a predetermined rotational direction, and a detecting device detecting the pieces.

5 Claims, 9 Drawing Sheets

(56) References Cited

U.S. PATENT DOCUMENTS

| | | | | | |
|---|---|---|---|---|---|
| 5,899,316 | A | * | 5/1999 | Ueno | A21C 9/085 198/412 |
| 6,158,315 | A | * | 12/2000 | Nowotny | A21C 3/06 83/102 |
| 8,327,998 | B2 | * | 12/2012 | Ueno | A21C 9/085 198/400 |
| 8,353,234 | B2 | * | 1/2013 | Takama | A21C 3/10 426/503 |
| 8,714,078 | B2 | * | 5/2014 | Ueno | A21C 9/085 198/418.7 |

* cited by examiner

APPARATUS FOR ALIGNING AND POSITIONING PIECES OF FOOD DOUGH

TECHNICAL FIELD

The inventions relate to an apparatus for aligning and positioning a plurality of pieces of food dough ("an aligning and positioning apparatus") on a conveyor so that the pieces of the dough are positioned with predetermined orientations and at predetermined intervals.

Particularly, they relate to an apparatus for aligning and positioning, with high dimensional accuracy and at high speed, each of a plurality of the pieces of food dough, which is cut from a sheet of food dough and has a triangular shape, for example, like a piece of croissant dough, wherein the pieces of food dough are laid out on the conveyor at predetermined intervals and are rotated so that a predetermined side of the triangular shape of each of them faces toward a predetermined direction.

BACKGROUND OF THE INVENTIONS

As a conventional technology associated with an apparatus for aligning and poisoning a plurality of pieces of food dough, each of which has a triangular shape for croissant dough, there is an apparatus for laying out and rotating pieces of croissant dough, which is disclosed in Patent Document 1.

In the apparatus for laying out and rotating pieces of croissant dough ("a laying-out and rotating apparatus") that is disclosed in Patent Document 1, an upstream conveyor, which conveys pieces of food dough so that a specific side of each of the pieces of food dough having a triangular shape becomes parallel to the moving direction of the conveyor, and a downstream conveyor, the speed of which is faster than that of the upstream conveyor, are arranged in series.

Above the connecting position of the upstream conveyor and the downstream conveyor, an apparatus for separating rows of the pieces of food dough in the moving direction of the conveyors ("a separating apparatus") by pins is disposed. Further, above the downstream conveyor, an apparatus for laying out the pieces of food dough in the perpendicular direction to the moving direction of the downstream conveyor ("a laying-out apparatus") by a pantograph type mechanism with pins is disposed.

Further, an apparatus for rotating the pins of the laying-out apparatus, which are used for laying out the pieces of food dough, 90 degrees to the predetermined direction ("a rotating apparatus") is disposed in the laying-out apparatus. Also, a plate for keeping the row of the pieces of the food dough in a line is disposed at the downstream side of the laying-out apparatus.

In the conventional laying-out and rotating apparatus used for the pieces of croissant dough, the separating apparatus repeats the following movements: lowering the pins, moving the pins toward the downstream side of the conveyor, lifting up the pins, and then moving the pins toward the upstream side of the conveyer.

The pins hold the pieces of food dough by lowering the pins of the separating apparatus. While the pieces of food dough are moved from the upstream conveyor to the downstream conveyor, since the pieces of food dough move toward the downstream side of the conveyor by slipping on the surface of the conveyor, the rows of the pieces of food dough are separated in the moving direction of the conveyors.

The laying-out apparatus lowers its pins, and then expands its pantograph type mechanism. The pins of the laying-out apparatus are rotated by the rotating apparatus simultaneously with or just after expanding the pantograph type mechanism. Next, the pins are lifted, and then the pantograph type mechanism is contracted. The series of these movements are repeated.

Since the laying-out apparatus holds the pieces of food dough by lowering its pins, the pantograph type mechanism of the laying-out apparatus expands, and the rotating apparatus rotates the pins, the pieces of food dough are separated and laid out in the perpendicular direction to the moving direction of the conveyors by slipping on the surface of the conveyor, and are rotated 90 degrees in the predetermined direction.

Then, bases of the triangular shapes of the pieces of food dough are kept in a line by the plate disposed at the downstream side of the laying-out apparatus.

In the conventional apparatus for laying-out and rotating the pieces of croissant dough explained above, since the separating apparatus, the laying-out apparatus, the rotating apparatus, and the plate for keeping the rows of the pieces of food dough in a line are synchronously operated in response to the speed of the upstream and the downstream conveyors, sometimes the center of the pin of the laying-out apparatus comes to a point off from a center of a piece of food dough having a triangular shape (the center is located on the center line extending in the perpendicular direction to the moving direction of the pieces of croissant dough). Under such condition, if the pins of the laying-out apparatus hold the pieces of croissant dough, lay out, and rotate them, the pieces could be located off the position where the pieces should be located.

Thus, for example, when the pieces of croissant dough are rolled up at the downstream position of the laying-out and rotating apparatus, it causes a trouble such that the pieces of croissant dough could not be well formed.

In the conventional apparatus for laying-out and rotating pieces of croissant dough explained above, the pantograph type mechanism operates as follows:

a rod connected to an arm pushes and pulls one of node points of the pantograph type mechanism by the reciprocating movement of the arm in the moving direction of the pieces of croissant dough, consequently the pantograph type mechanism expands and contracts in the perpendicular direction to the moving direction of the downstream conveyor (in the transverse direction of the conveyors).

As explained in the above paragraph, since the pantograph type mechanism is expanded and contracted by pushing and pulling one node point, when the mechanism is expanded and contracted, the pins of the laying-out apparatus disposed at the node points largely vibrate in a horizontal plane.

Thus, it could be difficult to position the pins stably and with a high degree of accuracy. Consequently, the pieces of croissant dough laid out and rotated could be located off the position where the pieces should be located.

In this case, when the pieces of croissant dough are rolled up at the downstream position of the laying-out and rotating apparatus, it causes a trouble such that the pieces of croissant dough could not be well formed.

Patent Document 1: Japanese Utility Model Laid-open Publication No. 113-61883

SUMMARY OF THE INVENTIONS

The present inventions have been conceived on the basis of the background technology discussed in the above paragraphs. The purpose of these inventions is to provide the following apparatus:

an apparatus for aligning and positioning with high dimensional accuracy and at high speed each of a plurality of pieces of food dough, which is cut from a sheet of food dough and has a triangular shape like a piece of croissant dough, wherein the pieces of food dough are laid out on the conveyor at predetermined intervals and are rotated so that predetermined sides of the triangular shapes of them face toward a predetermined direction.

To achieve the aforementioned purpose, a first aspect of the inventions has the following technical features:

an apparatus for aligning and positioning a plurality of pieces of food dough on a conveyor at predetermined intervals and predetermined orientation, the apparatus comprising:

an upstream conveyor conveying a plurality of the pieces of food dough, which are cut from a sheet of food dough, so that a specific side of each of the pieces of food dough having a triangular shape becomes parallel to the moving direction of the conveyor;

a downstream conveyor disposed at the downstream side of the upstream conveyor, wherein the downstream conveyor moves faster than the upstream conveyor;

a separating apparatus disposed above a connecting position of the upstream conveyor and the downstream conveyor, wherein the separating apparatus separates a plurality of the pieces of food dough set in a line in the perpendicular direction to the moving direction of the conveyors from the following row of the pieces of food dough, and translocates a plurality of the pieces of food dough from the upstream conveyor to the downstream conveyor;

a laying-out and rotating apparatus disposed at the downstream side of the separating apparatus and above the downstream conveyor, wherein the laying-out and rotating apparatus lays out and rotates a plurality of the pieces of food dough set in a line so that they are positioned at predetermined intervals in the perpendicular direction to the moving direction of the conveyors, and are rotated predetermined degrees in a predetermined rotational direction; and a detecting device disposed between the separating apparatus and the laying-out and rotating apparatus, and above the downstream conveyor, wherein the detecting device detects the pieces of food dough.

Further, a second aspect of the inventions has the following technical feature in addition to those of the first aspect of the inventions:

the detecting device includes at least two optical sensors.

Further, a third aspect of the inventions has the following technical feature in addition to those of the first aspect of the inventions:

the detecting device includes at least one image sensor.

Further, a fourth aspect of the inventions has the following technical feature in addition to those of the first to the third aspects of the inventions:

a shutter apparatus disposed at the downstream side of the laying-out and rotating apparatus, and above the downstream conveyor, wherein the shutter apparatus aligns a specific side of each of a plurality of the pieces of food dough set in a line.

Further, a fifth aspect of the inventions has the following technical features:

an apparatus for aligning and positioning a plurality of pieces of food dough on a conveyor at predetermined intervals and with predetermined orientation, the apparatus comprising:

an upstream conveyor conveying a plurality of the pieces of food dough, which are cut from a sheet of food dough, so that a specific side of each of the pieces of food dough having a triangular shape becomes parallel to the moving direction of the conveyor;

a downstream conveyor disposed at the downstream side of the upstream conveyor, wherein the downstream conveyor moves faster than the upstream conveyor;

a separating apparatus disposed above a connecting position of connecting the upstream conveyor and the downstream conveyor, wherein the separating apparatus separates a plurality of the pieces of food dough set in a line in the perpendicular direction to the moving direction of the conveyor from the following row of the pieces of food dough, and translocates a plurality of the pieces of food dough from the upstream conveyor to the downstream conveyor;

a laying-out and rotating apparatus disposed at the downstream side of the separating apparatus, and above the downstream conveyor, wherein the laying-out and rotating apparatus lays out and rotates a plurality of the pieces of food dough set in a line so that they are positioned at predetermined intervals in the perpendicular direction to the moving direction of the conveyors, and are rotated predetermined degrees in a predetermined rotational direction; and the laying-out and rotating apparatus comprising:

a pantograph type mechanism;

a plurality of holding and rotating devices disposed at node points of the pantograph type mechanism, wherein the holding and rotating devices hold and rotate the pieces of food dough; and a driving mechanism for expanding and contracting the pantograph type mechanism, wherein the driving mechanism expands and contracts the pantograph type mechanism by expanding and contracting a distance between two node points of it.

Effects of the Inventions

In the first aspect of the inventions, since pins of holding parts of the holding and rotating devices hold the pieces of food dough after detecting the pieces of food dough by the detecting device, as explained in detail below, it is possible to control the apparatus so that centers of the pins of the holding parts correspond to median lines of the pieces of food dough having a triangular shape.

Thus, the aligning and positioning apparatus can align and position the pieces of food dough with high dimensional accuracy and at high speed.

In the second aspect of the inventions, since the detecting device includes at least two optical sensors, as explained in detail below, it is possible not only to control the apparatus so that the centers of the pins of the holding parts correspond to the median lines of the pieces of food dough, but also to control the rotational direction of the laying-out and rotating apparatus as a function of directions of the pieces of food dough having a triangular shape, because the directions of the pieces of food dough can be detected.

Thus, the aligning and positioning apparatus can align and position the pieces of food dough with high dimensional accuracy and at high speed.

In the third aspect of the inventions, since the detecting device includes at least one image sensor, the device can detect positions, dimensions, and directions of the pieces of food dough having a triangular shape by image processing.

Thus, as explained in detail below, it is possible not only to control the apparatus so that the centers of the pins of the holding parts correspond to median lines of the pieces of food dough, but also to control the rotational direction of the laying-out and rotating apparatus as a function of directions of the pieces of food dough having a triangular shape, because the directions of the pieces of food dough can be detected, just like the second aspect of the inventions.

Thus, the aligning and positioning apparatus can align and position the pieces of food dough with high dimensional accuracy and at high speed.

Further, in the fourth aspect of the inventions, since the shutter apparatus aligns a specific base of each of the pieces of food dough in rows so that the bases become in line and parallel to the perpendicular direction to the moving direction of the downstream conveyor, the aligning and positioning apparatus can align and position the pieces of food dough with higher dimensional accuracy.

In the fifth aspect of the inventions, the laying-out and rotating apparatus includes the pantograph type mechanism, a plurality of the holding and rotating devices disposed at the node points of the pantograph type mechanism, wherein the holding and rotating devices hold and rotate the pieces of food dough, and the driving mechanism for expanding and contracting the pantograph type mechanism, wherein the driving mechanism expands and contracts the pantograph type mechanism by expanding and contracting the distance between two node points of it.

Thus, as explained in detail below, because the pantograph type mechanism does not largely vibrate while the mechanism is expanded and contracted, the aligning and positioning apparatus can align and position the pieces of food dough with high dimensional accuracy and at high speed.

Further, because the distance between two node points of the pantograph type mechanism can be set at an arbitrary value, when the distance between two node points of it is expanded and contracted, as explained in detail below, the aligning and positioning apparatus can align and position the pieces of food dough with an arbitrary interval.

PREFERRED EMBODIMENTS OF THE INVENTIONS

Below, based on figures, embodiments of an apparatus 1 for aligning and positioning pieces of food dough ("an aligning and positioning apparatus 1") of the inventions are explained in detail.

The following terms used in this specification are defined as follows:

"a conveying direction" means a direction that pieces of food dough 2 are conveyed by a conveyor, and is indicated by an arrow with X in figures;

"a perpendicular direction" means a direction that is perpendicular to the conveying direction, and is indicated by an arrow with Y in figures, and sometimes is called as "a transverse direction";

"an upstream side" and "a downstream side" mean an upstream position and a downstream position, on a path conveying the pieces of food dough 2 by the conveyors, respectively;

"a row of pieces of food dough 2" means a plurality of the pieces of food dough 2 that are aligned in the perpendicular direction;

"laying out" means spacing the pieces of food dough 2 in rows in the perpendicular direction so as to have a predetermined intervals between adjacent pieces;

"extending in a perpendicular direction across a width" means extending in the perpendicular direction beyond a width of the upstream conveyor 10 or the downstream conveyor 20;

"to rotate in a predetermined rotational direction and at a predetermined angle" means to rotate in a rotational direction and at an angle, that are preliminarily and arbitrarily set, depending on a shape, etc., of the pieces of food dough; and "a triangular shape" includes an approximately triangular shape, such as a shape that lacks a part of its edge.

Figure 1:
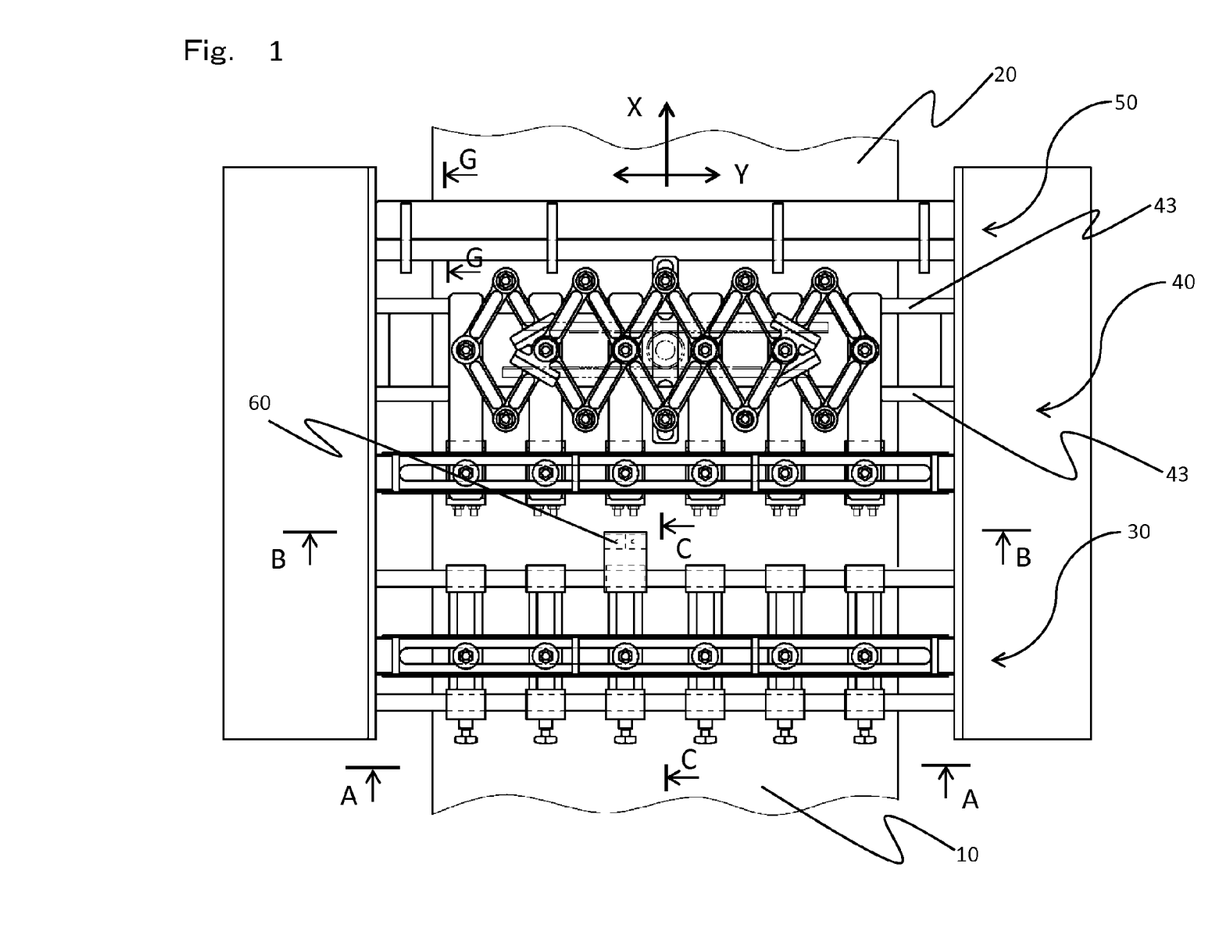
FIG. 1 is a plain view showing a whole configuration of an apparatus for aligning and positioning a plurality of pieces of food dough ("an aligning and positioning apparatus").

As shown in FIG. 1, an aligning and positioning apparatus 1 is comprised of an upstream conveyor 10, a downstream conveyor 20, a separating apparatus 30, a laying-out and rotating apparatus 40, a shutter apparatus 50, and a detecting device 60.

Figure 4:
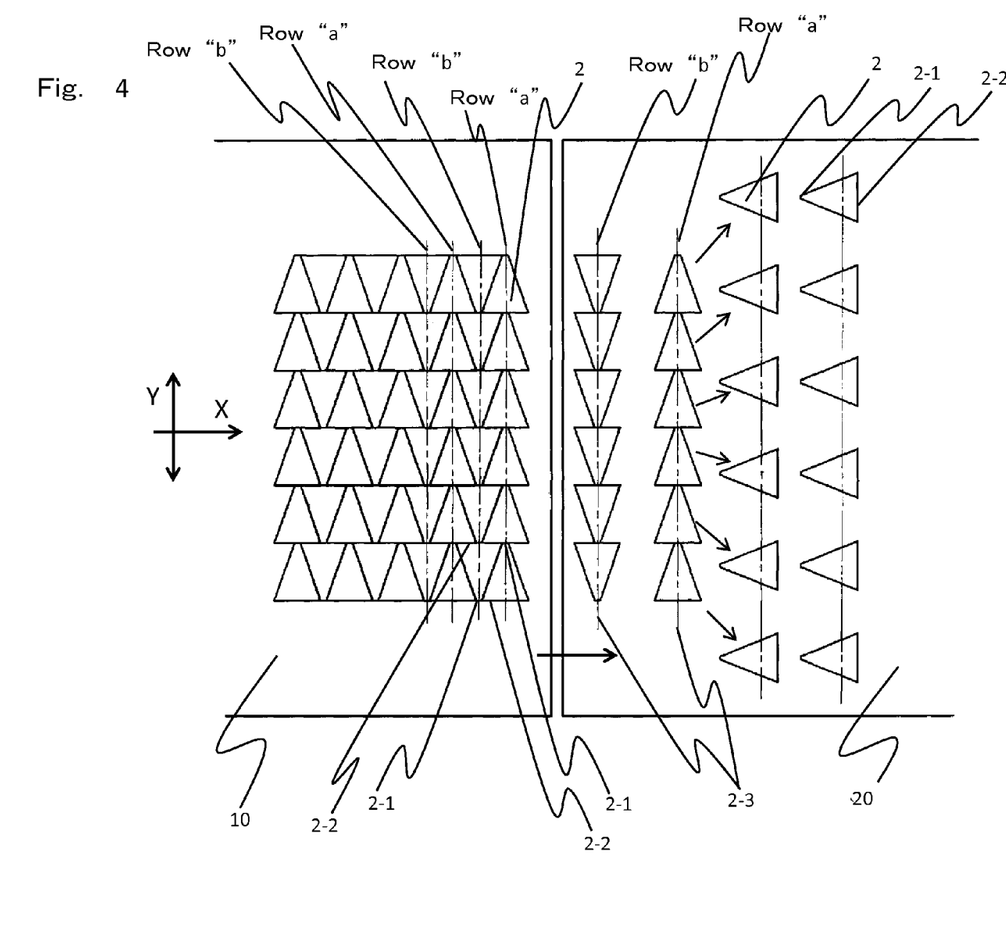
FIG. 4 shows a sequence of movements of the pieces of food dough such that a plurality of the pieces of food dough, which are cut from a sheet of food dough and have a triangular shape, are conveyed by an upstream conveyor and a downstream conveyor under the condition that the pieces are laying side-by-side, then are aligned and positioned.

As shown in FIG. 4, the upstream conveyor 10 conveys a plurality of pieces of food dough 2 having a triangular shape to a downstream side, wherein the pieces are cut from a sheet of food dough extended so as to have a predetermined thickness.

A plurality of the pieces of food dough 2 having a triangular shape are conveyed under the condition that the pieces of food dough 2 are laid side-by-side. In a row "a" of a plurality of the pieces of food dough 2 in FIG. 4, specific apexes 2-1 of the triangular shapes face the right side toward the upstream side in the conveying direction (the upper side in FIG. 4), and specific bases 2-2 of the triangular shapes that face toward the specific apexes 2-1 are parallel to the conveying direction.

Further, in a row "b" of a plurality of the pieces of food dough 2, specific apexes 2-1 of the triangular shapes face the left side toward the upstream side in the conveying direction (the lower side in FIG. 4), and specific bases 2-2 of the triangular shapes that face toward the specific apexes 2-1 are parallel to the conveying direction.

Namely, a plurality of the pieces of food dough 2 having a triangular shape are conveyed wherein the directions of the pieces in a row "a" and those in a row "b" are alternately different at 180 degrees, such as in rows "a," "b," "a," "b," . . . .

All of specific median lines 2-3 of a plurality of the pieces of food dough 2 having a triangular shape are aligned in the perpendicular direction both in the rows "a" and "b." Also, all of specific bases 2-2 of the pieces 2 are parallel to the conveying direction both in the rows "a" and "b."

It is explained above that the pieces of food dough 2 have a triangular shape. However, the shape of the pieces 2 is not limited to a triangular shape, and may be a trapezoidal, rectangular, or other shapes.

The downstream conveyor 20 is positioned close to the downstream end of the upstream conveyor 10, and also conveys a plurality of the pieces of food dough 2, which are conveyed by and transferred from the upstream conveyor 10, toward the downstream side.

To convey the pieces of food dough 2 by the downstream conveyor 20 with intervals between the rows in the conveying direction, the speed of the downstream conveyor 20 is set faster than that of the upstream conveyor 10.

Figure 2:
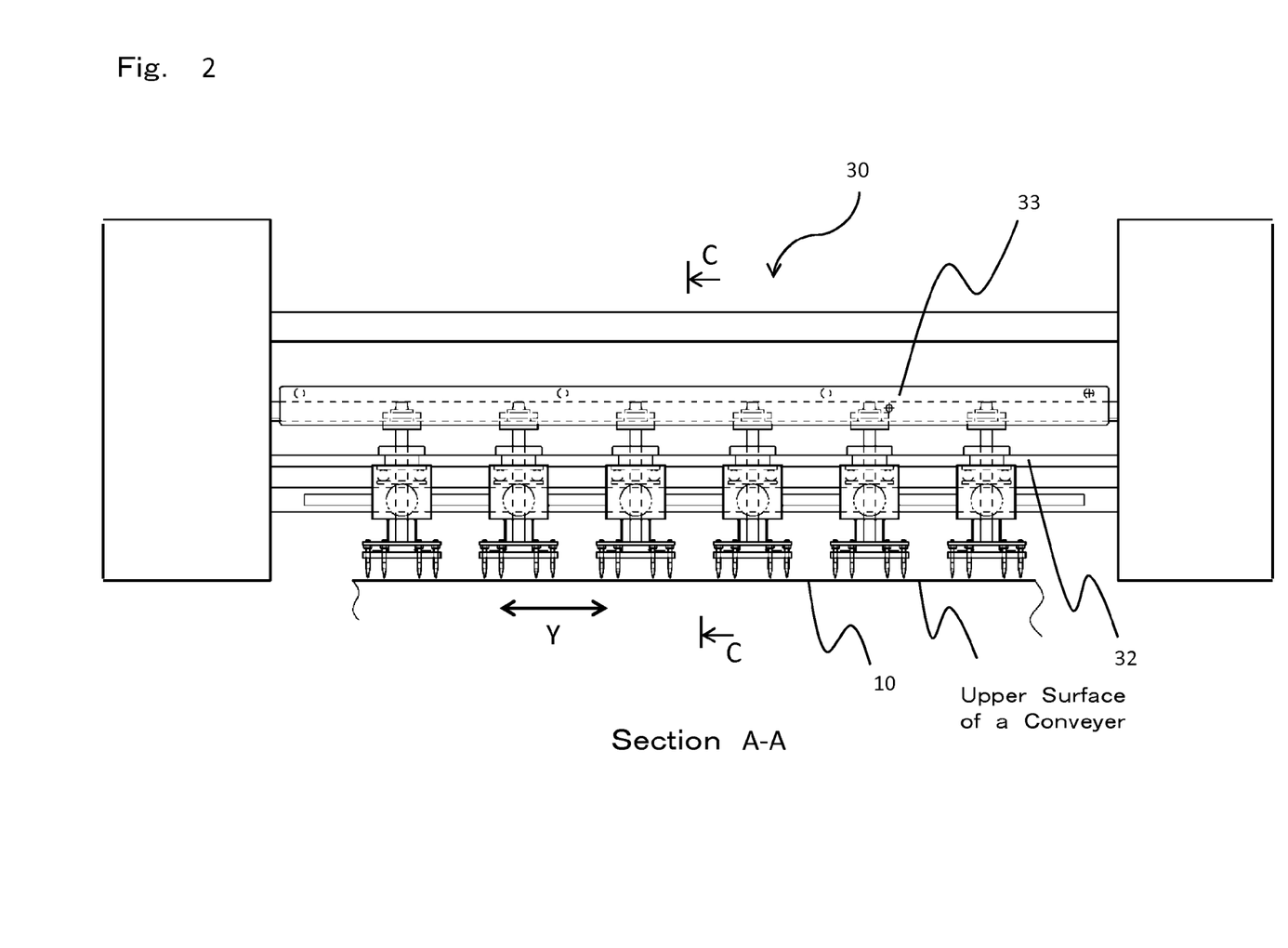
FIG. 2 is an elevational view of cross-section A-A of the aligning and positioning apparatus shown in FIG. 1, which mainly shows a part of a separating apparatus.
Figure 3:
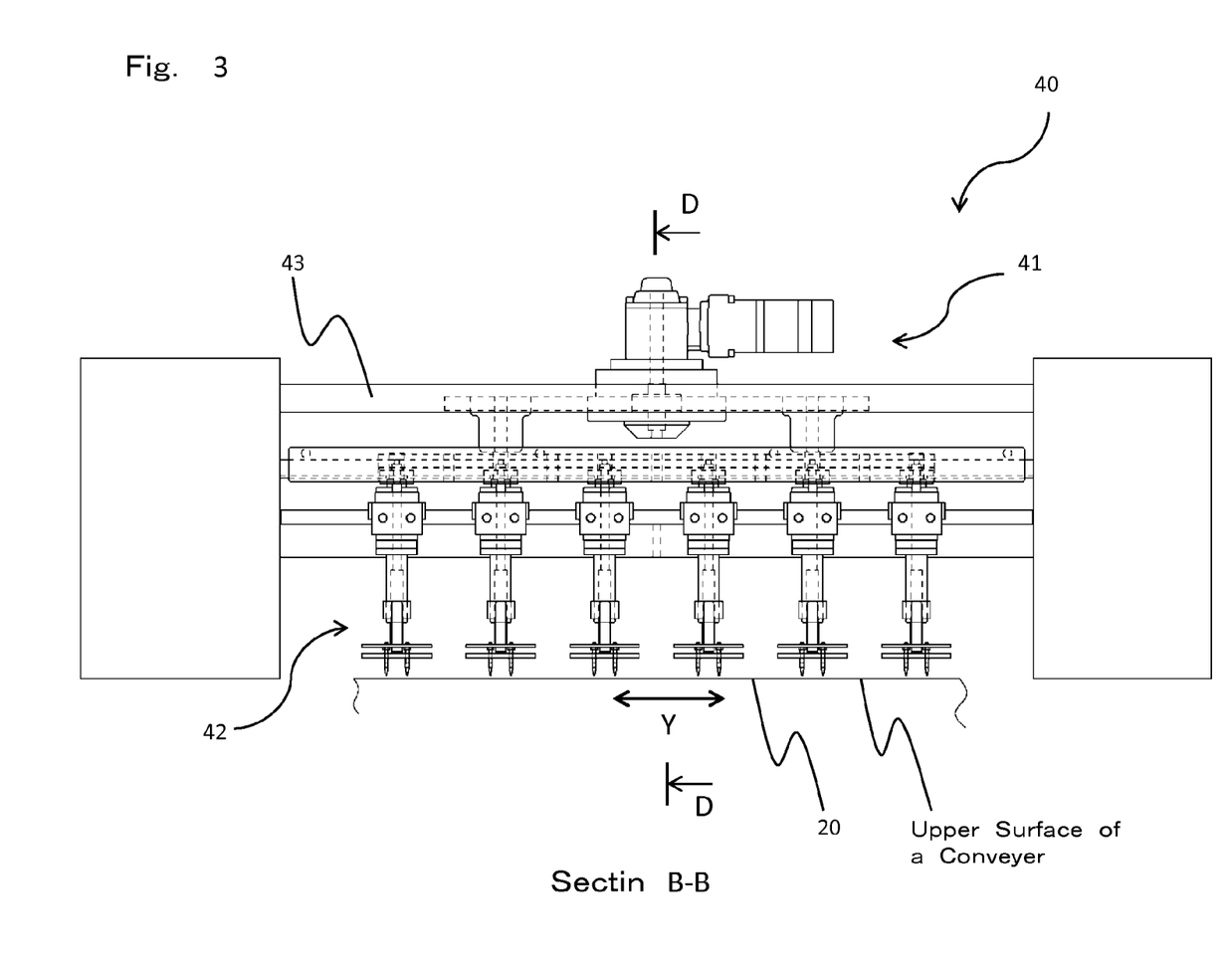
FIG. 3 is an elevational view of cross-section B-B of the aligning and positioning apparatus shown in FIG. 1, which mainly shows a part of a laying-out and rotating apparatus.
Figure 5:
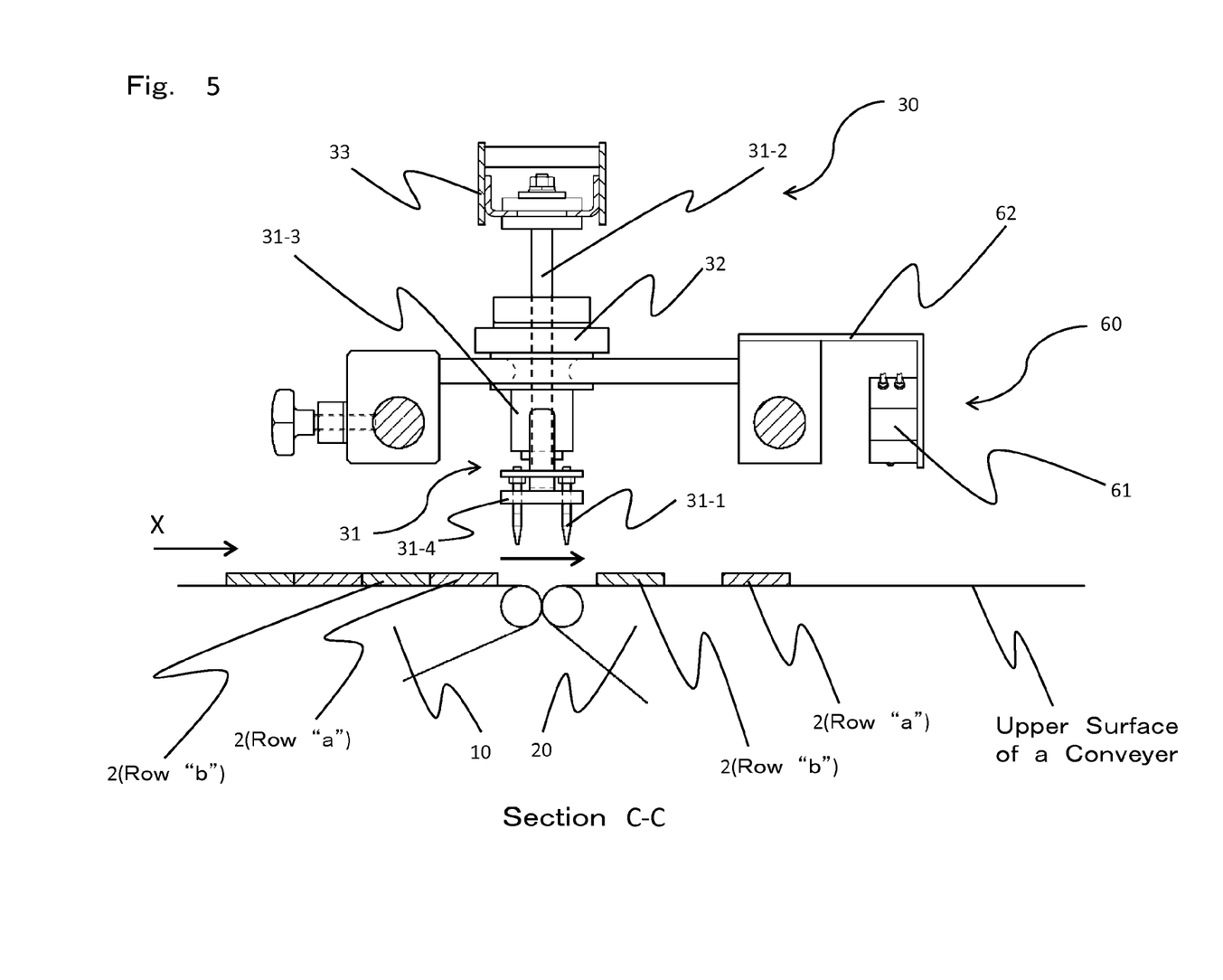
FIG. 5 shows a view of cross-section C-C of the separating apparatus shown in FIG. 2, and shows a side elevational view of one of the separating apparatuses and a detecting device disposed at the downstream side of the separating apparatus.

Below, the constitution of the separating apparatus 30 is explained based on FIGS. 1, 2, and 5. FIG. 5 shows cross-section C-C of the separating apparatus 30 shown in FIGS. 1 and 2. (In FIG. 5, the detecting device 60 is also shown.)

The separating apparatus 30 is disposed above the connecting position of the upstream conveyor 10 and the downstream conveyor 20. The separating apparatus 30 separates a plurality of the pieces of food dough 2 aligned in a row from the following row of the pieces 2, and translocates them from the upstream conveyor 10 to the downstream conveyor 20.

The separating apparatus 30 includes the same number of holding mechanisms 31 as that of the pieces of food dough 2 in each row ("a," "b," "a," "b," . . . ), which are conveyed by the upstream conveyor 10. The holding mechanisms 31 are disposed on a supporting beam 32 to support the holding mechanisms 31 with equal intervals correspond to those of a plurality of food dough 2 in each row, wherein the beam 32 extends in the perpendicular direction across the width.

Each holding mechanism 31 is fixed on the supporting beam 32 and comprised of the following:

a holding member 31-3 of a shaft having a cylindrical part vertically extending in its inside;

the shaft 31-2 slidably and vertically disposed in the cylindrical part of the holding member 31-3;

a pushing plate 31-4 connected with and fixed to the lower end of the holding member 31-3; and a plurality of pins 31-1 fixed to the lower end of the shaft 31-2.

Further, the upper end of the shaft 31-2 is fixed to a vertically-moving beam 33, which is disposed above the supporting beam 32 and extends in a perpendicular direction across the width. Further, a plurality of the pins 31-1 can slide up and down in a plurality of holes disposed in the pushing plate 31-4.

The supporting beam 32 supports a plurality of the holding mechanisms 31 by means of the holding members 31-3. The supporting beam 32 reciprocates in a predetermined range above the connecting position of the upstream conveyor 10 and the downstream conveyor 20 in the direction parallel to the conveying direction by a driving device (not shown).

The vertically-moving beam 33 also reciprocates in the direction parallel to the conveying direction together with the supporting beam 32 by a driving device (not shown).

Further, the vertically-moving beam 33 moves up and down by a driving device (not shown).

Namely, while the vertically-moving beam 33 reciprocates in the direction parallel to the conveying direction together with the supporting beam 32, the vertically-moving beam 33 reciprocates in the direction perpendicular to the conveying surface of the pieces of food dough 2.

Thus, by means of the movements of the supporting beam 32 and the vertically-moving beam 33, a plurality of the pins 31-1 can move down from a position above the conveying surface of the pieces of food dough 2 to a position close to the conveying surface, can move toward the downstream side in the conveying direction, can move up from the position close to the conveying surface of the pieces of food dough 2 to the position above the conveying surface, and can move toward the upstream side in the conveying direction.

Then, the pieces of food dough 2 are translocated from the upstream conveyor 10 to the downstream conveyor 20, and further a specific row (e.g., a row "a") of the pieces of food dough 2 is separated from the following row (e.g., a row "b") and conveyed by the pins 31-1 of the separating apparatus 30 (namely, the rows "a" and "b" of the pieces of food dough 2 are conveyed in the conveying direction with a predetermined intervals).

Below, these operations are explained in detail.

First, the pins 31-1 move down to the position close to the conveying surface of the pieces of food dough 2 from the position above the conveying surface and hold the pieces 2 by sticking them, which are conveyed by the upstream conveyor 10. At this time, the pins 31-1 move down through the holes disposed in the pushing plate 31-4 so as to stick out from the pushing plate 31-4.

Then, while the pins 31-1 are holding the pieces 2, the pins 31-1 horizontally move to the surface of the downstream conveyor 20 in the conveying direction at a faster speed than that of the upstream conveyor 10. At this time, the pieces 2 are moved on the surfaces of the upstream conveyor 10 and the downstream conveyor 20 by sliding on the surfaces.

Next, the pins 31-1 move up from the position close to the conveying surface of the pieces 2 to the position above the conveying surface, and consequently the pins 31-1 depart from the pieces 2. At this time, since the pins 31-1 move up through the holes disposed in the pushing plate 31-4, and the pieces 2 are relatively pushed down by the pushing plate 31-4, even if the pieces get stuck to the pins 31-1, the pieces 2 are surely separated from the pins 31-1.

After the pins 31-1 move up above the conveying surface of the pieces 2, the pins 31-1 horizontally move from the position above the downstream conveyor 20 to the position above the upstream conveyor 10, and return to the initial position.

Each row (each of rows "a," "b," "a," "b," . . . ) of the pieces of food dough can be serially and surely translocated from the upstream conveyor 10 to the downstream conveyor 20, by repeating the movement of the pins 31-1 as explained in the above paragraphs.

Since the downstream conveyor 20 conveys the pieces of food dough 2 at the faster speed than that of the upstream conveyor 10, the rows of the pieces 2 that are translocated to the downstream conveyor 20 are conveyed in the conveying direction with a predetermined interval between the rows.

Since the separating apparatus 30 is driven in synchronization with the movement of the upstream conveyor 10, the separating apparatus 30 can be operated corresponding to the condition of the pieces 2 conveyed by the upstream conveyor 10. Further, since the pieces 2 are forced to be translocated from the upstream conveyer 10 to the downstream conveyor 20 by the pins 31-1, the positions or directions of the pieces 2 are not disarrayed due to getting stuck to the end of the conveyors, etc., when the pieces 2 are translocated.

In the explanation in the above paragraphs, each of the movements of the pins 31-1 of moving downward, horizontally moving, and moving upward starts after a preceding movement is completed. However, it is not limited to that configuration. In so far as each of the rows of the pieces of food dough 2 can be smoothly translocated from the upstream conveyor 10 to the downstream conveyor 20, the pins 31-1 may horizontally move while moving downward or may horizontally move while moving upward.

Figure 6:
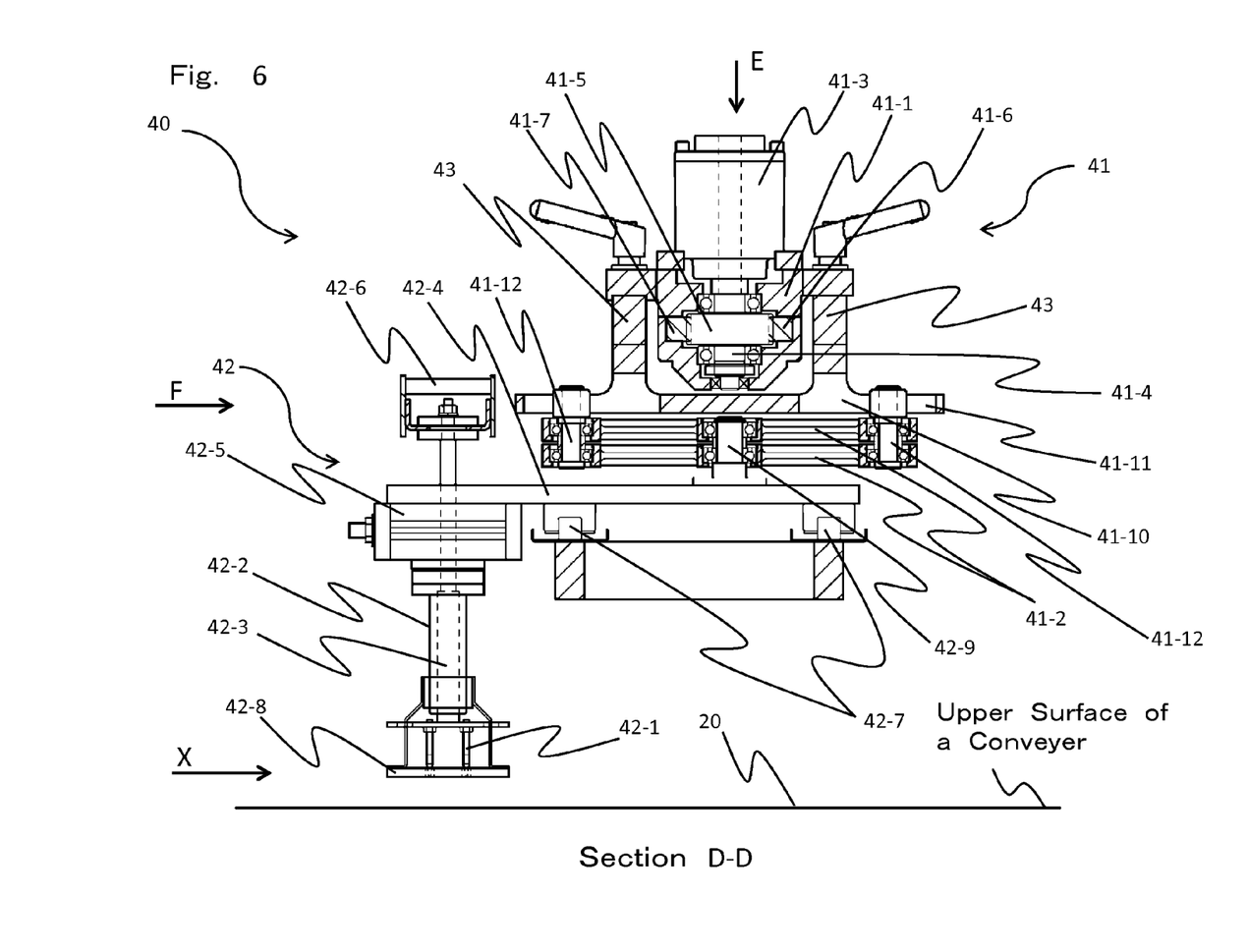
FIG. 6 shows a view of cross-section D-D of the laying-out and rotating apparatus shown in FIG. 3, and shows a side elevational view of the laying-out and rotating apparatus.
Figure 7:
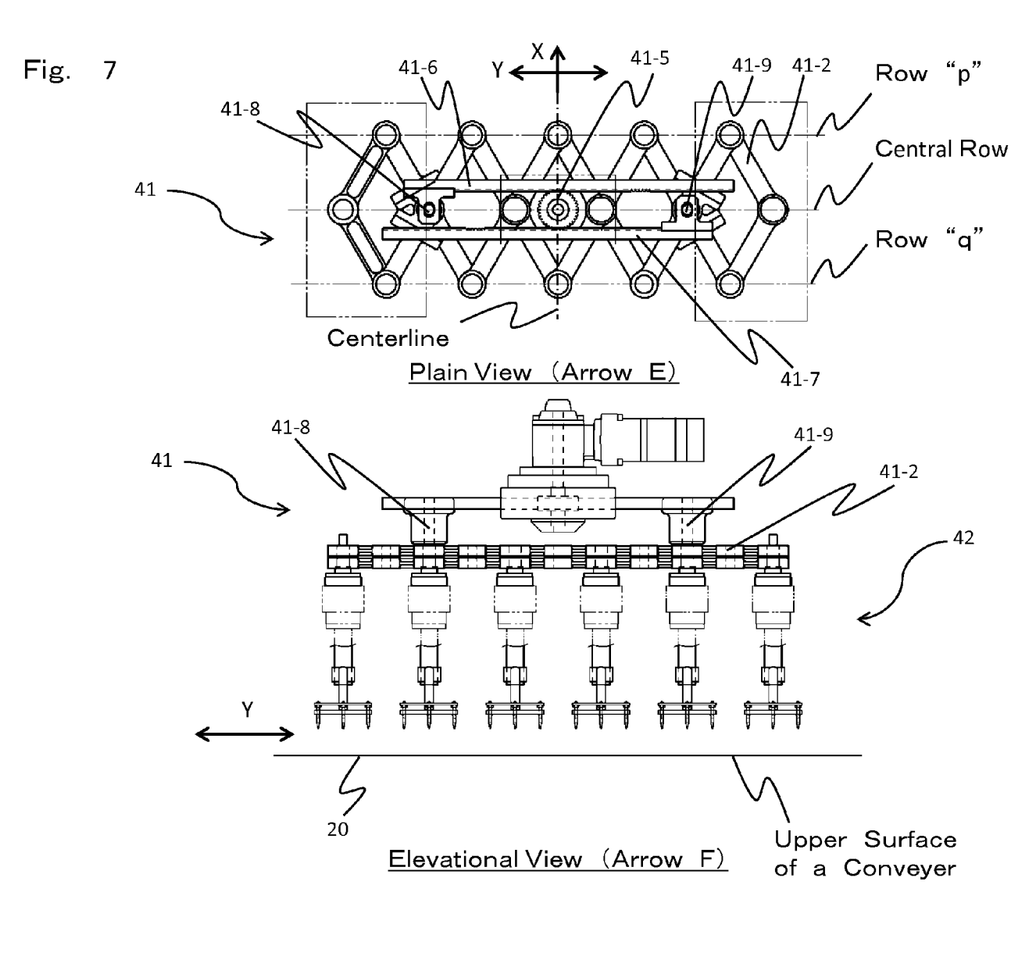
FIG. 7 shows a plain view of the laying-out and rotating apparatus (indicated by arrow E shown in FIG. 6) and an elevational view of it (indicated by arrow F shown in FIG. 6).

Next, the laying-out and rotating apparatus 40 is explained based on FIGS. 1, 3, 6, and 7. FIG. 6 shows cross-section D-D of the laying-out and rotating apparatus 40 shown in FIG. 3. Further, FIG. 7 shows mainly a plain view of a laying-out mechanism 41 of the laying-out and rotating apparatus 40 (indicated by arrow E shown in FIG. 6), and an elevational view of the whole apparatus (indicated by arrow F shown in FIG. 6).

The laying-out and rotating apparatus 40 is disposed at the downstream side of the separating apparatus 30 and above the downstream conveyor 20.

The laying-out and rotating apparatus 40 is comprised of;

a laying-out mechanism 41 having a pantograph type mechanism 41-2, wherein the laying-out mechanism 41 expands and contracts the pantograph type mechanism 41-2; and a rotating mechanism 42 having a plurality of pins 42-1 for sticking and holding pieces of food dough 2, wherein the rotating mechanism 42 rotates and moves up and down a plurality of the pins 42-1.

The laying-out and rotating apparatus 40 has the same number of the rotating mechanisms 42 as that of the pieces of food dough 2 in each row (each of the rows "a," "b," . . . ) conveyed by the conveyors. A plurality of the rotating mechanisms 42 are connected to the node points of the pantograph type mechanism 41-2.

A main structure 41-1 of the laying-out mechanism 41 is fixed to two supporting beams 43 to support whole of the laying-out and rotating apparatus 40, and is disposed at the center of the downstream conveyor 20 in the perpendicular direction.

A driving motor 41-3, such as a servomotor, is fixed on the main structure 41-1 of the laying-out mechanism 41. A rotating shaft 41-4 of the driving motor 41-3 is rotatably supported by the main structure 41-1 by means of a bearing, and downwardly extends inside the main structure 41-1.

A pinion gear 41-5 is fixed to the rotating shaft 41-4 of the driving motor 41-3. A first rack gear 41-6 and a second rack gear 41-7, which are supported by the main structure 41-1, face each other, and are engaged with the pinion gear 41-5.

A first holding member 41-8 extending downwardly is disposed at the left end of the first rack gear 41-6 (the rack gear shown in the upper side of the plain view of FIG. 7), and a second holding member 41-9 extending downwardly is disposed at the right end of the second rack gear 41-7 (the rack gear shown in the lower side of the plain view of FIG. 7).

A guide plate 41-10 is disposed under the main structure 41-1 and the two supporting beams 43, and at the position above the centerline of the downstream conveyor 20 extending in the conveying direction (see FIG. 7), and is fixed to the lower surfaces of the two supporting beams 43.

Slotted through holes 41-11 extending in the conveying direction are disposed near the both ends of the guide plate 41-10.

Thus, the guide plate 41-10 is placed so that the centerline of the slotted through holes 41-11 corresponds to the centerline extending in the conveying direction of the downstream conveyor 20.

The pantograph type mechanism 41-2 used for the laying-out mechanism 41 has the configuration shown in FIG. 7, and is comprised of links and node points. In the pantograph type mechanism 41-2 of this embodiment shown in FIG. 7, the numbers of the node points in rows "p" and "q" are five, respectively, and the number of the node points in the central row is six. However, the mechanism is not limited to that configuration. The number of the node points in each row may be increased or decreased.

The first and second holding members 41-8 and 41-9 explained above, which are disposed at the left and right ends of the first and second rack gear 41-6 and 41-7, and which extend downwardly, are fixed to protruded members extending upwardly from the node points located at the left and right sides of the central row of the pantograph type mechanism 41-2, respectively.

In the embodiment shown in FIG. 7, the first and second holding members 41-8 and 41-9 are fixed to the protruded members located in the central row of the pantograph type mechanism 41-2, and located at the second node points from the left and right ends toward the center of the central row.

However, the locations of the first and second holding members 41-8 and 41-9 are not limited to that configuration.

In so far as the first and second holding members 41-8 and 41-9 can be located with a predetermined interval in the perpendicular direction to the conveying direction of the pieces of food dough 2, the first and second holding members 41-8 and 41-9 may be fixed to other node points in the central row of the pantograph type mechanism 41-2, or fixed to other node points in the row "p" or "q" of the pantograph type mechanism 41-2.

Protruded shafts 41-12 extending upwardly are rotatably inserted into the two node points that are located on the rows "p" and "q" and on the centerline (see FIG. 7) of the pantograph type mechanism 41-2 shown in FIG. 7.

The two protruded shafts 41-12 are slidably inserted into the slotted through holes 41-11 so as to slide along the longitudinal direction of the slotted through holes 41-11 disposed near the both ends of the guide plate 41-10 explained above.

Since the centerlines of the slotted through holes 41-11 extending in the conveying direction correspond to the centerline extending in the conveying direction of the downstream conveyor 20, when the pantograph type mechanism 41-2 expands and contracts, the two protruded shafts 41-12 slide along the centerline extending in the conveying direction of the downstream conveyer 20.

Thus, the pantograph type mechanism 41-2 expands and contracts symmetrically on either side of the centerline extending in the conveying direction of the downstream conveyor 20.

In this embodiment, the mechanism using racks and a pinion is explained as a driving mechanism for expanding and contracting the pantograph type mechanism 41-2. However, the driving mechanism is not limited to that configuration.

A cylinder device using a pressurized fluid or a linear actuator, etc., may also be used for the driving mechanism to expand and contract the pantograph type mechanism 41-2.

When the number of the rotating mechanisms 42 is small, such as three, the three rotating mechanisms 42 can be expands and contracted in the perpendicular direction (transverse direction), not by disposing a plurality of the driving mechanisms at a plurality of the node points, but by disposing one driving mechanism at only one node point.

The rotating mechanisms 42 are disposed at holes at the node points in the central row of the pantograph type mechanism 41-2. (In this embodiment, 6 sets of the rotating mechanisms 42 are disposed.)

Below, the rotating mechanism 42 is explained in detail.

The rotating mechanism 42 is comprised of;

a cylindrical structure 42-2 having an elongate through hole inside it;

a rotating shaft 42-3 disposed through the hole of the cylindrical structure 42-2, wherein the rotating shaft 42-3 can freely rotate and move up and down in the hole;

a plurality of pins 42-1 fixed to the distal end of the rotating shaft 42-3, for holding and rotating the piece of the food dough 2;

a supporting plate 42-4 longwise extending in the conveying direction;

a rotational driving mechanism 42-5 fixed to the distal side of the supporting plate 42-4 (the upstream side in the conveying direction of the downstream conveyor 20);

a moving up-and-down beam 42-6 holding the upper end of the rotating shaft 42-3 and extending in the perpendicular direction across the width of the downstream conveyor 20, wherein the beam 42-6 is moved up and down by a moving up-and-down mechanism (not shown); and two linear moving mechanisms 42-7 to move the supporting plate 42-4 so that the longitudinal direction of the supporting plate 42-4 always becomes parallel to the conveying direction.

As the linear moving mechanism 42-7, a linear motion mechanism using a ball bearing, which is known and described as a linear motion guide, may be used.

The rotating shaft 42-3 of the rotating mechanism 42 has a plurality of the pins 42-1 at its lower end, and extends upwardly through the elongate through hole of the cylindrical structure 42-2. The rotating shaft 42-3 extending upwardly from the upper end of the cylindrical structure 42-2 passes inside the rotational driving mechanism 42-5 and through the supporting plate 42-4, and further extends upwardly, wherein the rotating shaft 42-3 can freely rotate and move up and down. The upper end of the rotating shaft 42-3 is fixed to the moving up-and-down beam 42-6.

As an example of the rotational driving mechanism 42-5, a power source, such as a rotary actuator, may be used.

Further, a pushing plate 42-8 having a plurality of holes is fixed to the lower end of the cylindrical structure 42-2. A plurality of the pins 42-1 disposed at the lower end of the rotating shaft 42-3 pass through a plurality of holes of the pushing plate 42-8, and protrude downwardly. Further, the upper end of the cylindrical structure 42-2 is fixed to the distal side of the supporting plate 42-4 by means of the rotational driving mechanism 42-5.

A connecting shaft 42-9 is disposed at the proximal side (downstream side in the conveying direction) of the supporting plate 42-4, and protrudes upwardly. The upper end of the connecting shaft 42-9 is rotatably connected to the hole disposed at the node point in the central row of the pantograph type mechanism 41-2.

Further, the two linear moving mechanisms 42-7 extending in the perpendicular direction across the width of the downstream conveyor 20 are disposed under the supporting plate 42-4. The supporting plate 42-4 is fixed to the two linear moving mechanisms 42-7.

Thus, the direction of the supporting plate 42-4 is maintained so that the longitudinal direction of it always becomes parallel to the conveying direction, and the supporting plate 42-4 moves in the perpendicular direction.

Next, movements for laying-out the pieces of food dough 2 in rows in the perpendicular direction on the downstream conveyor 20 and for rotating them in a predetermined rotational direction and at a predetermined angle, by the pins 42-1 of the laying-out and rotating apparatus 40, are explained.

When the detecting device 60, which is explained in detail later, detects a row of a plurality of the pieces of food dough 2, wherein the row is translocated from the upstream conveyor 10 to the downstream conveyor 20 by the separating apparatus 30, is positioned with a predetermined interval between the rows in the conveying direction, and is conveyed on the downstream conveyor 20, the moving up-and-down beam 42-6 begins to move down by the moving up and down mechanism (not shown).

When the moving up-and-down beam 42-6 moves down, the rotating shaft 42-3 fixed to the beam 42-6 and having a plurality of the pins 42-1 at its lower end moves down. Then, a plurality of the pins 42-1 stick one of the pieces of food dough 2 in a row, and hold the piece 2.

After a plurality of pins 42-1 hold the piece 2, the rotating shaft 41-4 is rotated by the driving motor 41-3 of the laying-out mechanism 41. When the rotating shaft 41-4 is rotated, the pinion gear 41-5 fixed to the rotating shaft 41-4 is rotated, then the first holding member 41-8 disposed at the first rack gear 41-6 and the second holding member 41-9 disposed at the second rack gear 41-7 move in the perpendicular direction so as to get away from each other.

Since the first and second holding members 41-8 and 41-9 are fixed to the protruded shafts extending upwardly from the node points disposed at the left and right side in the central row of the pantograph type mechanism 41-2, when the first and second holding members 41-8 and 41-9 move in the perpendicular direction so as to get away from each other, the pantograph type mechanism 41-2 expands in the perpendicular direction.

Since, when the pantograph type mechanism 41-2 is expanded and contracted, the two protruded shafts 41-12 disposed on the centerline of the pantograph type mechanism 41-2 are slidably inserted into the slotted through holes 41-11 so as to slide along the longitudinal direction of the slotted through holes 41-11 disposed near the both ends of the guide plate 41-10, the pantograph type mechanism 41-2 expands and contracts symmetrically at both sides of the centerline of the downstream conveyor 20 extending in the conveying direction.

The rotating mechanism 42 is connected to each node point in the central row of the pantograph type mechanism 41-2, through the connecting shafts 42-9. In particular, the supporting plate 42-4 is fixed to the lower end of the connecting shaft 42-9, the cylindrical structure 42-2 is fixed to the distal side of the supporting plate 42-4 by means of the rotational driving mechanism 42-5, the rotating shaft 42-3 of the rotating mechanism 42 is disposed at the distal side of the supporting plate 42-4 through the inside of the cylindrical structure 42-2, and the rotating shaft 42-3 can freely rotate and move up and down.

Since, corresponding to the expanding motion of the pantograph type mechanism 41-2, a plurality of the pins 42-1 fixed to the lower end of the rotating shaft 42-3 also move in the perpendicular direction, the pieces of food dough 2 held by a plurality of the pins are laid out in the perpendicular direction by sliding on the downstream conveyor 20 so that the pieces are positioned with predetermined intervals.

During or after the expanding motion of the pantograph type mechanism 41-2, the rotating shaft 42-3 is rotated by the rotational driving mechanism 42-5, and the piece of food dough 2 is rotated in a predetermined rotational direction and at a predetermined angle.

The rotational direction and angle of the piece of the food dough 2 are determined depending on the shape and the direction of the piece 2 that is conveyed by the upstream conveyor 10.

For example, when the piece of the food dough 2 shown in FIG. 4 is conveyed, it is determined as follows:

in case of a plurality of the pieces 2 in a row "a," the piece 2 is rotated counterclockwise 90 degrees so that the specific apex 2-1 of the triangular shape faces toward the upstream side in the conveying direction; and in case of a plurality of the pieces 2 in a row "b," the piece 2 is rotated clockwise 90 degrees so that the specific apex 2-1 of the triangular shape faces toward the upstream side in the conveying direction.

After the piece of the food dough 2 is rotated in a predetermined rotational direction and at a predetermined angle by the rotation of the rotating shaft 42-3, a plurality of the pins 42-1 that are sticking the piece 2 move up and are separated from the piece 2 by the moving up motion of the moving up-and-down beam 42-6 by the driving device (not shown).

At this time, since a plurality of the pins 42-1 disposed at the lower end of the rotating shaft 42-3 protrude downwardly through a plurality of the holes of the pushing plate 42-8, when the pins 42-1 move up, the piece of food dough 2 is relatively pushed down by the pushing plate 42-8, and the pins 42-1 are surely separated from the piece 2.

As shown in FIG. 4, the pieces of food dough 2 separated from a plurality of the pins 42-1 are positioned with a predetermined intervals in the conveying direction and the perpendicular direction, and are conveyed so that the specific base 2-2 of the triangular shape of each of the pieces 2 is located at the downstream side in the conveying direction and the specific apex 2-1 of it faces toward the upstream side in the conveying direction.

In the laying-out and rotating apparatus 40 explained in above paragraphs, since the pantograph type mechanism 41-2 can be expanded and contracted in an arbitrary dimension, the intervals of the pieces 2 laid out in the perpendicular direction can be set in an arbitrary dimension.

Further, in the rotating mechanism 42 explained in above paragraphs, since linkage mechanisms, etc., are not used for the rotational driving mechanism 42-5, but a driving mechanism to directly rotate the rotating shaft 42-3, such as a rotary actuator, is used for it, the pieces of food dough 2 can be accurately rotated at a predetermined angle.

Further, in the above paragraphs, it is explained that the rotating mechanisms 42 are disposed at holes disposed at the node points in the central row of the pantograph type mechanism 41-2.

However, it is not always necessary that the rotating mechanisms 42 are disposed at every node point in the central row. The rotating mechanisms 42 may not be disposed at any node points in the central row.

The positioning of a plurality of the pins 42-1 disposed at the lower end of the rotating shaft 42-3 is not limited to a specific configuration. For example, the pins 42-1 may be positioned on a circle with equal intervals.

However, to appropriately rotate the pieces of food dough 2 in the rows "a" and "b" by clockwise rotating the shaft 42-3 90 degrees and by counterclockwise rotating the rotating shaft 42-3 90 degrees, the pins 42-1 must be positioned so that at least two pins of them always stick the piece 2.

Figure 8:
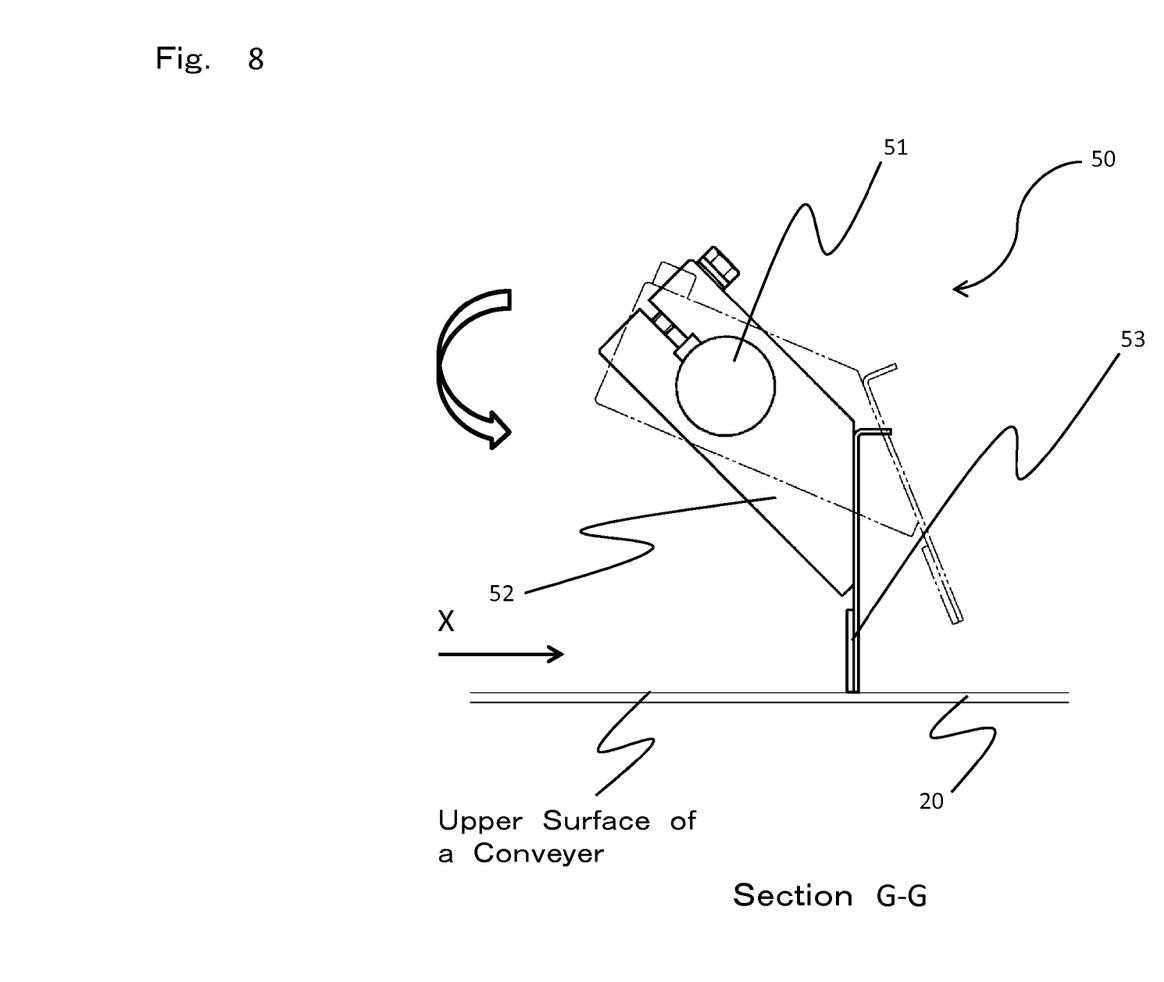
FIG. 8 shows a view of cross-section G-G shown in FIG. 1, and shows a side elevational view of a shutter apparatus.

Next, the shutter apparatus 50 is explained based on FIGS. 1 and 8. FIG. 8 shows a view of cross-section G-G shown in FIG. 1, and shows a side elevational view of the shutter apparatus 50.

The shutter apparatus 50 is disposed at the downstream side of the laying-out and rotating apparatus 40. The shutter apparatus 50 aligns the pieces of food dough 2 set in a line, wherein the pieces 2 are positioned with predetermined intervals in the conveying and perpendicular directions, and are faced toward a predetermined direction by the laying-out and rotating apparatus 40 so that specific bases 2-2 of the pieces of food dough 2 having a triangular shape are set in a line in the perpendicular direction.

The shutter apparatus 50 is comprised of;

a rotating shaft 51 extending in the perpendicular direction across the width of the downstream conveyor 20;

brackets 52 disposed at a plurality of positions in the longitudinal direction of the rotating shaft 51; and shutter plates 53 fixed to the distal sides of the brackets 52.

When the rotating shaft 51 is rotated clockwise at a predetermined angle (in the inverse direction of the arrow indicating a rotational direction in FIG. 8) by the rotational driving means (not shown), the shutter plates 53 face toward the horizontal direction, and the distal ends of the shutter plates 53 come to the upper surface of the downstream conveyor 20.

Further, when the rotating shaft 51 counterclockwise rotates at a predetermined angle (in the direction of the arrow indicating a rotational direction in FIG. 8), and the distal ends of the shutter plates 53 move up to enough heights from the upper surface of the downstream conveyor 20 so that the plates 53 do not contact with the pieces of food dough 2, while the plates 53 are inclining.

Below, the operation for aligning the pieces of food dough 2 having a triangular shape by the shutter apparatus 50 so that the specific bases 2-2 of the pieces 2 are set in a line in the perpendicular direction is explained.

When the rotating shaft 51 is rotated clockwise at a predetermined angle by the rotational driving means (not shown), the shutter plates 53 face toward the horizontal direction, and the distal ends of the shutter plates 53 come to the upper surface of the downstream conveyor 20.

The pieces of food dough 2 are conveyed on the downstream conveyor 20 so that the specific bases 2-2 of the triangular shapes are positioned at the downstream side in the conveying direction, and are parallel to the perpendicular direction, wherein the specific apexes 2-1 of the triangular shapes face toward the upstream side in the conveying direction.

Thus, when the distal ends of the shutter plates 53 are positioned on the upper surface of the downstream conveyor 20, and a row of the pieces of food dough 2 is conveyed to where the plates 53 are located on the downstream conveyor 20, the specific bases 2-2 of the pieces 2 having a triangular shape reach the plates 53, and are aligned in a line so that the specific bases 2-2 are parallel to the perpendicular direction to the conveying direction.

At the time when the specific bases 2-2 of the pieces of food dough 2 are aligned in a line and parallel to the perpendicular direction, the rotating shaft 51 is rotated counterclockwise at a predetermined angle, and the distal ends of the shutter plates 53 move up to enough heights from the upper surface of the downstream conveyor 20 so that the plates 53 do not contact with the pieces 2, while the plates 53 are inclining.

When the distal ends of the shutter plates 53 move up to enough heights where the plates 53 do not contact with the pieces of food dough 2, the row of the pieces 2 that is aligned in a line so that the specific bases 2-2 of the triangular shapes are parallel to the perpendicular direction, and that is accurately aligned and positioned on the downstream conveyor 20, is conveyed to a following apparatus for the next processing.

Since the shutter apparatus 50 is driven in synchronization with the movement of the laying-out and rotating apparatus 40 and the downstream conveyor 20, the shutter apparatus 50 is driven corresponding to the condition of the conveyance of the pieces 2.

Figure 9:
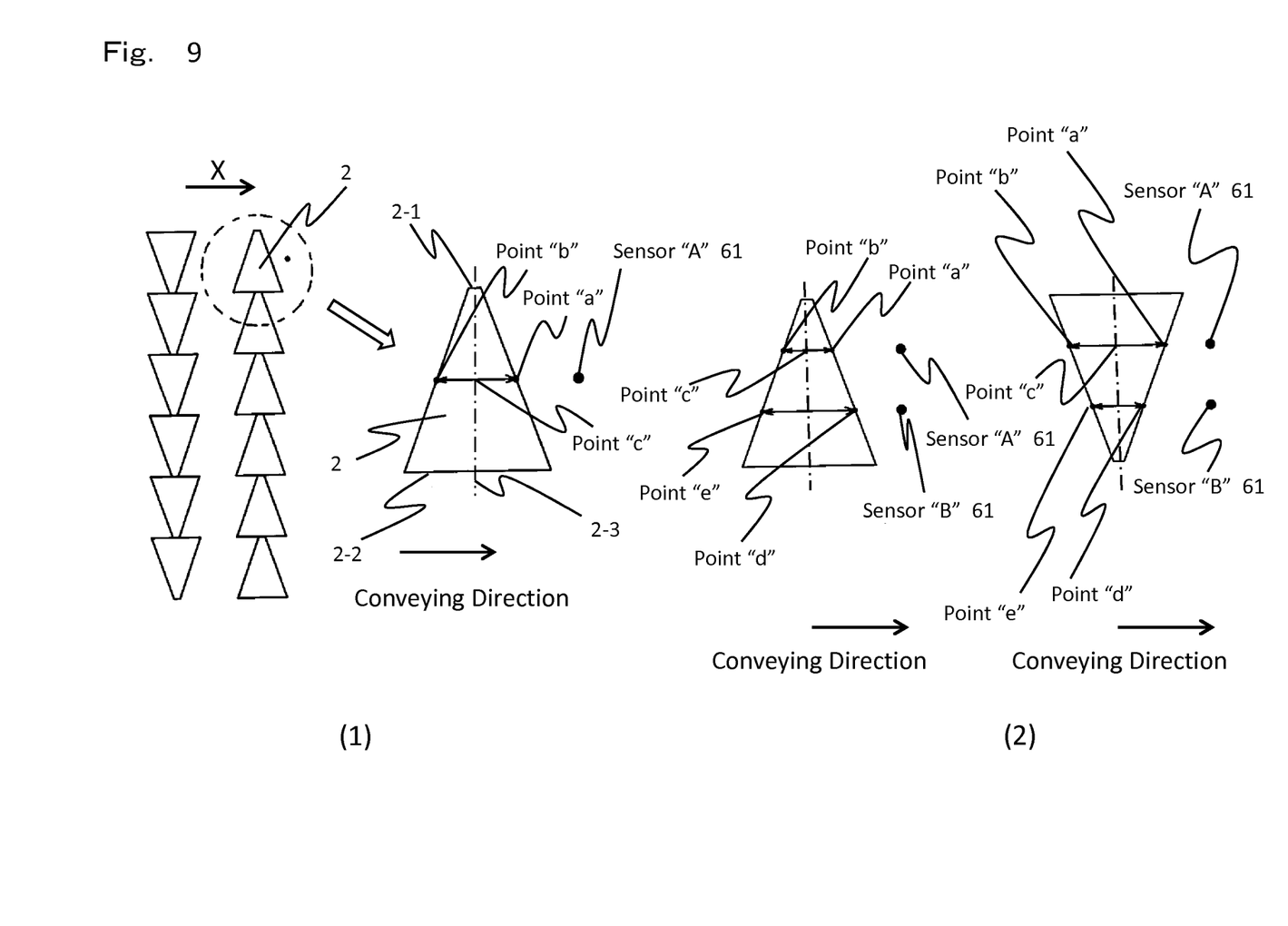
FIG. 9 is a set of explanatory drawings to explain a method for detecting the pieces of food dough by the detecting device, and shows the relationship between the position of the sensor of the detecting device and that of the pieces.

Next, the detecting device 60 is explained based on FIGS. 5 and 9. FIG. 9 is a set of explanatory drawings to explain a method for detecting the pieces of food dough 2 by the detecting device 60, which shows the relationships of the positions of sensors 61 of the detecting device 60 and the pieces 2.

The detecting device 60 is disposed between the separating apparatus 30 and the laying-out and rotating apparatus 40 (namely, at the downstream side of the separating apparatus 30 and at the upstream side of the laying-out and rotating apparatus 40), and above the downstream conveyor 20 (see FIG. 5). The laying-out and rotating apparatus 40 is driven according to signals detected by the detecting device 60.

The detecting device 60 is comprised of a sensor(s) 61 and a mounting bracket 62. The sensor(s) 61 is mounted to one end of the mounting bracket 62, and the other end of the mounting bracket 62 is connected to the fixed structure. As the sensor(s) 61, at least one or two optical sensors may be used, or at least one image sensor may be used.

In a case where one optical sensor is used for the sensor 61 (namely, only sensor "A" is used), as shown in FIG. 9(1), the optical sensor can detect the time when points "a" and "b" of the piece of food dough 2 having a triangular shape that is conveyed on the downstream conveyor 20 pass the position of the sensor "A." Thus, a position of a point "c" located on the median line of the piece 2 having the triangular shape can be calculated based on the speed of the downstream conveyor 20 and the time when the points "a" and "b" pass the position of the sensor "A."

Thus, the laying-out and rotating apparatus 40 can be controlled so that the center of a plurality of the pins 42-1 of the laying-out and rotating apparatus 40 coincides with a position on the median line of the piece 2 having a triangular shape. Consequently, an accuracy of the positioning of the center of the piece of food dough 2 that is aligned and positioned can be improved dramatically.

In a case where two optical sensors are disposed (namely, sensors "A" and "B" are used), as shown in FIG. 9(2), the optical sensors can detect the time when points "a" and "b" of the piece of food dough 2 having a triangular shape that is conveyed on the downstream conveyor 20 pass the position of the sensor "A," and the time when points "c" and "d" of the piece 2 pass the position of the sensor "B." Thus, the widths of the piece 2 can be calculated by comparing the time when the points "a" and "b" pass the position of the sensor "A" and the time when the points "c" and "d" pass the position of the sensor "B." Consequently, the direction of the piece 2 can be identified.

Thus, the laying-out and rotating apparatus 40 can be controlled so that the center of a plurality of the pins 42-1 of the laying-out and rotating apparatus 40 coincides with the position on the median line of the piece of food dough 2 having a triangular shape. Furthermore, the movement of the laying-out and rotating apparatus 40 can be controlled by determining the rotational direction of the piece 2 having a triangular shape that is conveyed.

As explained above, by using two optical sensors, since it is possible to determine the rotational direction of the piece of food dough 2 having a triangular shape that is conveyed, even if the directions of the pieces 2 that are conveyed vary (for example, the rows of the pieces 2 are conveyed in the following order, "a," "b," "b," "a" . . . ), the pieces 2 can be aligned and positioned with regularity so that the pieces 2 are positioned toward a predetermined direction.

Further, in a case where one image sensor is used for the sensor 61, by processing the detected image data, the positions of the median lines and the directions, of the pieces of food dough 2 having a triangular shape that are conveyed can be detected. Thus, the same effects as those in a case where the two optical sensors are disposed can be achieved.

Further, by calculating inclinations of the median lines of the pieces of food dough 2 that are conveyed to the perpendicular direction to the conveying direction, the pieces 2 can be rotated so that the median lines of the pieces 2 are parallel to the conveying direction by controlling the movement of the laying-out and rotating apparatus 40.

EXPLANATIONS OF DENOTATIONS 1 an aligning and positioning apparatus (an apparatus for aligning and positioning pieces of food dough)
2 pieces of food dough
2-1 a specific apex of a triangular shape
2-2 a specific base of a triangular shape
2-3 a specific median line of a triangular shape
10 an upstream conveyor
20 a downstream conveyor
30 a separating apparatus
31 a holding mechanism
31-1 a pin (a pin of holding mechanisms or a pin of a separating apparatus)
31-2 a shaft
31-3 a holding member
31-4 a pushing plate
32 a supporting beam
33 a vertically moving beam
40 a laying-out and rotating apparatus
41 a laying-out mechanism
41-1 a main structure
41-2 a pantograph type mechanism
41-3 a driving motor
41-4 a rotating shaft (a rotating shaft of a laying-out mechanism 41)
41-5 a pinion gear
41-6 a first rack gear
41-7 a second rack gear
41-8 a first holding member
41-9 a second holding member
41-10 a guide plate
41-11 slotted through holes (slotted through holes of a guide plate)
41-12 protruded shafts
42 a rotating mechanism
42-1 a pin (a pin of a rotating mechanism or a pin of a laying-out and rotating apparatus)
42-2 a cylindrical structure
42-3 a rotating shaft (a rotating shaft of a rotating mechanism)
42-4 a supporting plate
42-5 a rotational driving mechanism
42-6 a moving up-and-down beam
42-7 linear moving mechanisms
42-8 a pushing plate
42-9 a connecting shaft
43 a supporting beam
50 a shutter apparatus
51 a rotating shaft
52 brackets
53 shutter plates
60 a detecting device
61 a sensor
62 a mounting bracket

We claim:
1. An apparatus for aligning and positioning a plurality of pieces of food dough on a conveyor at predetermined intervals and predetermined orientations, the apparatus comprising:

an upstream conveyor conveying a plurality of pieces of food dough, which are cut from a sheet of food dough, so that specific sides of the pieces of food dough having a triangular shape become parallel to the moving direction of the conveyor;

a downstream conveyor disposed at the downstream side of the upstream conveyor, wherein the downstream conveyor moves faster than the upstream conveyor;

a separating apparatus disposed above a connecting position of the upstream conveyor and the downstream conveyor, wherein the separating apparatus separates a plurality of the pieces of food dough set in a line in the perpendicular direction to the moving direction of the conveyor from the following row of the pieces of food dough, and translocates a plurality of the pieces of food dough from the upstream conveyor to the downstream conveyor;

a laying-out and rotating apparatus disposed at the downstream side of the separating apparatus, and above the downstream conveyor, wherein the laying-out and rotating apparatus lays out and rotates a plurality of the pieces of food dough set in a line so that they are positioned at predetermined intervals in the perpendicular direction to the moving direction of the conveyor and are rotated 90 degrees in a predetermined rotational direction; and a detecting device disposed between the separating apparatus and the laying-out and rotating apparatus, and above the downstream, wherein the detecting device detects the median lines and directions of the pieces of the food dough to control the laying-out and rotating apparatus so that the centers of a plurality of pins of the laying-out and rotating apparatus coincide with the positions on the median lines of the pieces of the food dough and to determine the rotational direction of the laying-out and rotating apparatus.

2. The apparatus for aligning and positioning a plurality of pieces of food dough according to claim 1, wherein the detecting device includes at least two optical sensors.

3. The apparatus for aligning and positioning a plurality of pieces of food dough according to claim 1, wherein the detecting device includes at least one image sensor.

4. The apparatus for aligning and positioning a plurality of pieces of food dough according to claim 1, further comprising:

a shutter apparatus disposed at the downstream side of the laying-out and rotating apparatus, and above the downstream conveyor, wherein the shutter apparatus aligns specific sides of a plurality of the pieces of food dough set in a line.

5. An apparatus for aligning and positioning a plurality of pieces of food dough on a conveyor at predetermined intervals and predetermined orientations, the apparatus comprising:

an upstream conveyor conveying a plurality of pieces of food dough, which are cut from a sheet of food dough, so that specific sides of the pieces of food dough having a triangular shape become parallel to the moving direction of the conveyor;

a downstream conveyor disposed at the downstream side of the upstream conveyor, wherein the downstream conveyor moves faster than the upstream conveyor;

a separating apparatus disposed above a connecting position of the upstream conveyor and the downstream conveyor, wherein the separating apparatus separates a plurality of the pieces of food dough set in a line in the perpendicular direction to the moving direction of the conveyor from the following row of the pieces of food dough, and translocates a plurality of the pieces of food dough from the upstream conveyor to the downstream conveyor;

a laying-out and rotating apparatus disposed at the downstream side of the separating apparatus, and above the downstream conveyor, wherein the laying-out and rotating apparatus lays out and rotates a plurality of the pieces of food dough set in a line so that they are positioned at predetermined intervals in the perpendicular direction to the moving direction of the conveyor and are rotated 90 degrees in a predetermined rotational direction; and the laying-out and rotating apparatus comprising:

a pantograph mechanism;

a plurality of holding and rotating devices disposed at node points of the pantograph mechanism, wherein a plurality of holding and rotating devices hold and rotate the pieces of food dough; and a driving mechanism for expanding and contracting the pantograph mechanism, wherein the driving mechanism expands and contracts the pantograph mechanism by applying forces acting on two node points of the pantograph mechanism in the perpendicular direction to the moving direction of the conveyor.

* * * * *